(12) United States Patent
Kung et al.

(10) Patent No.: US 10,860,522 B2
(45) Date of Patent: Dec. 8, 2020

(54) METHOD AND APPARATUS FOR CONTROLLING USB-C CONNECTORS ON SYSTEM WITH MULTIPLE HOST CONTROLLERS

(71) Applicant: Intel Corporation, Santa Clara, CA (US)

(72) Inventors: Tin-Cheung Kung, Folsom, CA (US); Chia-Hung S. Kuo, Folsom, CA (US); Nivedita Aggarwal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 689 days.

(21) Appl. No.: 15/600,516

(22) Filed: May 19, 2017

(65) Prior Publication Data
US 2018/0336159 A1 Nov. 22, 2018

(51) Int. Cl.
*G06F 13/42* (2006.01)
*G06F 13/40* (2006.01)
*G06F 13/38* (2006.01)

(52) U.S. Cl.
CPC ...... *G06F 13/4282* (2013.01); *G06F 13/4022* (2013.01); *G06F 13/385* (2013.01); *G06F 13/4004* (2013.01); *G06F 13/4027* (2013.01)

(58) Field of Classification Search
CPC .............. G06F 13/4282; G06F 13/385; G06F 13/4004; G06F 13/4027; G06F 2213/0042
See application file for complete search history.

(56) References Cited

U.S. PATENT DOCUMENTS

| | | | |
|---|---|---|---|
| 2006/0294274 A1* | 12/2006 | Bennett | G06F 13/4059 710/100 |
| 2007/0233909 A1* | 10/2007 | Derr | G06F 1/3203 710/36 |
| 2012/0210431 A1* | 8/2012 | Stahlberg | H04W 12/1208 726/24 |
| 2012/0233373 A1* | 9/2012 | Ohashi | G06F 13/38 710/313 |
| 2012/0290761 A1* | 11/2012 | Chen | G06F 13/4045 710/305 |
| 2013/0019034 A1* | 1/2013 | Lida | H04L 12/2832 710/38 |
| 2013/0346650 A1* | 12/2013 | Uehara | G06F 13/385 710/63 |
| 2014/0365690 A1* | 12/2014 | Paramasivam | G06F 13/385 710/8 |

OTHER PUBLICATIONS

"Advanced Configuration and Power Interface Specification," Version 6.0, Apr. 2015, 1056 pages.
(Continued)

*Primary Examiner* — Glenn A. Auve
(74) *Attorney, Agent, or Firm* — Nicholson De Vos Webster & Elliott, LLP

(57) ABSTRACT

A method and system for manages mapping of universal serial bus (USB) connectors to a plurality of USB host controllers. The method determines an enumeration of USB connectors in a system, identifying USB host controllers in the system, generating a grouping for a USB connector with USB host controllers, and configures USB routing in the system to map the USB connector with the USB host controllers according to the grouping.

20 Claims, 10 Drawing Sheets

(56) References Cited

OTHER PUBLICATIONS

IEEE Std 802.11-2012: "Part 11: Wireless LAN Medium Access Control (MAC) and Physical Layer (PHY) Specifications," IEEE Standard for Information technology—Telecommunications and information exchange between systems, Local and metropolitan area networks—Specific requirements, Mar. 29, 2012, 2793 pages.
IEEE Std 802.11a-1999(R2003): "Part 11: Wireless LAN Medium Access Control (MAC) and Physical Layer (PHY) Specifications, High-speed Physical Layer in the 5 GHz Band," IEEE Standard for Information technology—Telecommunications and information exchange between systems, Local and metropolitan area networks—Specific requirements, reaffirmed Jun. 12, 2003, copyright 1999, 91 pages.
IEEE Std 802.11ac-2013 "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunications and information exchange between systems, Local and metropolitan area networks—Specific requirements, Dec. 18, 2013, 425 pages.
IEEE Std. 802.11b-1999: "Higher Speed Physical Layer (PHY) Extension in the 2.4 GHz Band," IEEE Standard for Information Technology, Telecommunications and information exchange between systems, Local and Metropolitan networks, Specific requirements, Part 11: Wireless LAN Medium Access Control (MAC) and Physical Layer (PHY) specifications, Sep. 16, 1999, 96 pages.
IEEE Std 802.11g-2003: "Part 11: Wireless LAN Medium Access Control (MAC) and Physical Layer (PHY) Specifications, Amendment 4: Further Higher Data Rate Extension in the 24 GHz Band," IEEE Standard for Information technology—Telecommunications and information exchange between systems, Local and metropolitan area networks—Specific requirements, Jun. 27, 2003, 78 pages.
IEEE Std 802.11n-2009: "Part 11: Wireless LAN Medium Access Control (MAC) and Physical Layer (PHY) Specifications, Amendment 5: Enhancements for Higher Throughput," IEEE Standard for Information technology—Telecommunications and information exchange between systems, Local and metropolitan area networks—Specific requirements, Oct. 29, 2009, 536 pages.
JEDEC Standard, "Low Power Double Data Rate 2 (LPDDR2)," JESD209-2E (Revision of JESD209-2D, Dec. 2010), JEDEC Solid State Technology Association, Apr. 2011, 284 pages.
PCI Express Base Specification Revision 3.0, Nov. 10, 2010, 860 pages.
TPM Main Part 1 "Design Principles," Specification Version 1.2, Revision 62, TCG Copyright, Oct. 2, 2003, 161 pages.
TPM Main Part 2 "TPM Structures," Specification Version 1.2, Revision 62, TCG Published, Oct. 2, 2003, 176 pages.
"Universal Serial Bus Power Delivery Specification," Revision 3.0, V1.0a, ECNs, Aug. 2, 2016, 528 pages.
"Universal Serial Bus Power Delivery Specification," Revision 3.0, V1.0a, Mar. 25, 2016, 513 pages.
"Universal Serial Bus Type-C Cable and Connector Specification," Release 1.2, Mar. 25, 2016, 221 pages.
Wigig White Paper, Wireless Gigabit Alliance, Defining the Future of Multi-Gigabit Wireless Communications, Jul. 2010, 5 pages.

\* cited by examiner

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1- | $V_{BUS}$ | CC1 | D+ | D- | SBU1 | $V_{BUS}$ | RX2- | RX2+ | GND |
| GND | RX1+ | RX1- | $V_{BUS}$ | SBU2 | D- | D+ | CC2 | $V_{BUS}$ | TX2- | TX2+ | GND |
| B12 | B11 | B10 | B9 | B8 | B7 | B6 | B5 | B4 | B3 | B2 | B1 |

METHOD AND APPARATUS FOR CONTROLLING USB-C CONNECTORS ON SYSTEM WITH MULTIPLE HOST CONTROLLERS

TECHNICAL FIELD

Embodiments of the invention relate to the field of interconnections for computing devices; and more specifically, to the operations of universal serial buses in detecting connected devices.

BACKGROUND

The serial peripheral interconnect (SPI) is an interface bus utilized for exchanging data between microcontrollers and small peripheral devices. These peripheral devices can include registers, sensors, memory cards, and similar devices. The SPI bus is generally suitable for short distance communication. The SPI bus is a synchronous serial interface and a four wire bus. A successor to SPI is call enhanced SPI (eSPI) and enables a reduction in the number of pins required on motherboards in comparison with prior standards. eSPI provides greater throughput and reduces the working voltage required for operation.

The universal serial bus (USB) standard is a standard that defines cables, connections and communication protocols used for connection, communication and power supply between electronic devices. The USB standard has evolved over time to utilize various connector types and support varying features. Amongst these USB standards is the USB type-C standard that defines a reversible plug connector for USB devices. The Type-C plug connects to electronic devices that function as both hosts and connected devices.

Connecting an electronic device to a host device such as computing system having a motherboard, central processing unit (CPU) and similar components encompasses having circuitry that detects the connection of the electronic device. Where a device is connected via a USB Type-C connector port, there is circuitry that detects the connection of a cable and electronic device to the connector port. This enables the software and circuitry that manage the USB communication protocols to initiate communication and power controls for the connected device. This detection circuitry is placed on the motherboard and adds cost and complexity to the motherboard configuration and design.

The existing system design architecture of computing systems has a number of physical limitations. These systems include all solder-down USB Type-C connectors (i.e. root ports). These solder-down USB-C connectors are the children of a single USB host controller. The existing system design allows the USB host controller to be suspended but not self-hot-removed. In addition, there is no specific mechanism available between Platform firmware (FW), BIOS and the operating system (OS) to communicate USB connector number assignment.

BRIEF DESCRIPTION OF THE DRAWINGS

The present disclosure is illustrated by way of example and not limitation in the figures of the accompanying drawings, in which like references indicate similar elements and in which.

DETAILED DESCRIPTION

Figure 1:
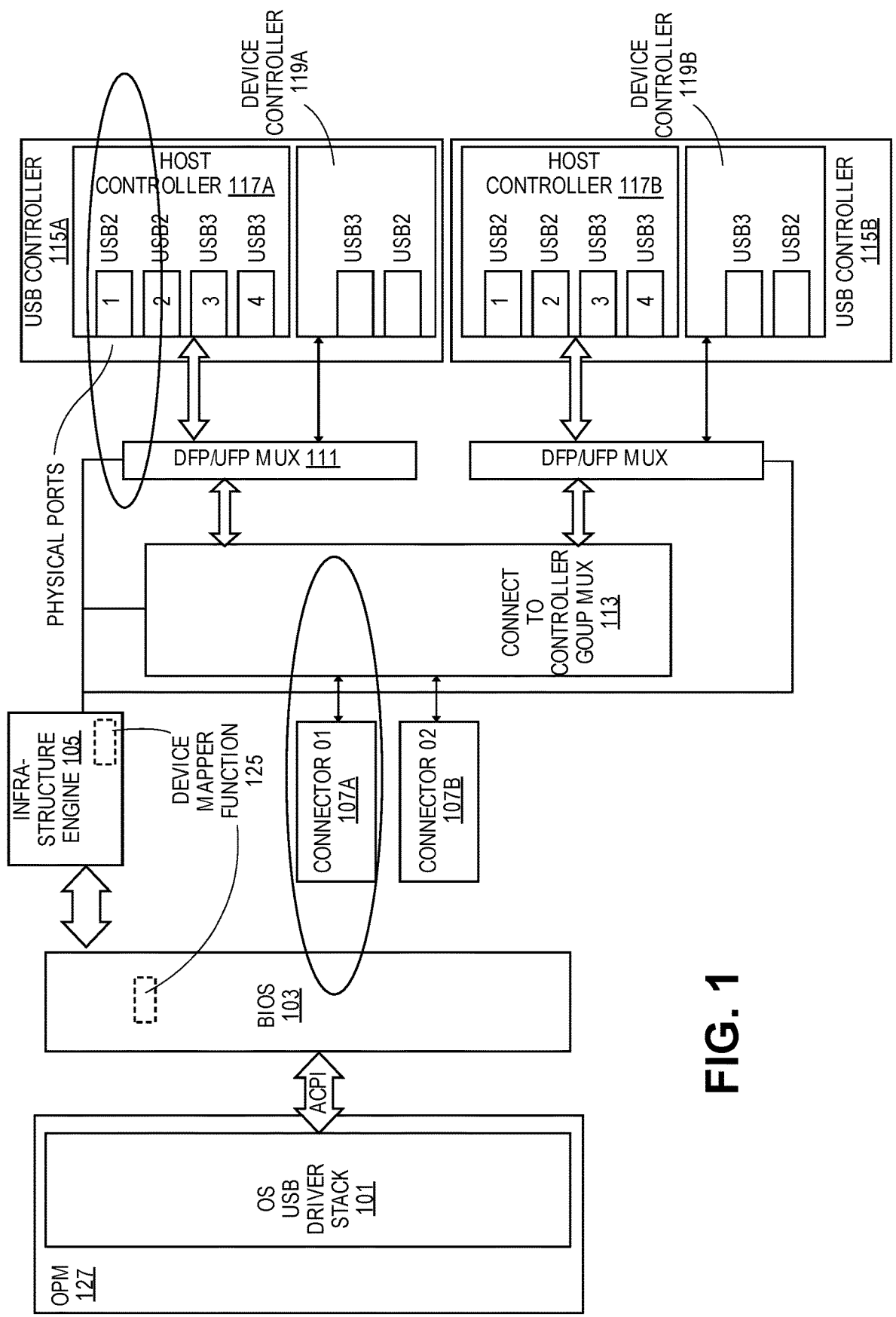
FIG. 1 is a diagram of the platform demonstrating a static assignment of connectors to a USB host controller at system start up.

The embodiments provide a set of processes and mechanisms that improve the functionality of universal serial bus (USB) connection and, in particular, USB Type-C connectors. The embodiments provide a system/platform design capable of supporting multiple USB-C connectors and can employ multiple USB host controllers to improve overall system capabilities related to USB/USB-C subsystems. The embodiments enable the support of new types of connectors capable of routing USB signals (e.g., USB3/USB2 signals) of each connector to an arbitrary USB host controller at any connection time. The embodiments enable each USB host controller to be suspended and self-hot-removed without advanced configuration and power interface (ACPI) disruption. The embodiments further provide a mechanism available between Platform FW, BIOS and OS to communicate connector number assignment.

In the following description, numerous specific details are set forth. However, it is understood that embodiments of the disclosure may be practiced without these specific details. In other instances, well-known circuits, structures, and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Electronics (e.g., computing systems) generally employ one or more electrical connections (e.g., wired or wireless connections) to facilitate the transmission and reception of data (e.g., communication) between devices, such as, but not limited to, between a computing system (e.g., a computer including a hardware processor) and a (e.g., external) peripheral. Non-limiting examples of peripherals are external storage devices (e.g., hard disk drives) and mobile devices (e.g., smartphones and tablets).

Certain electrical connections (e.g., couplings) include parallel conductors (e.g., parallel wires or other electrically conductive paths). One embodiment of an electrical connection is a bus. One embodiment of a bus is a multiple conductor bus, for example, where the conductors (e.g., wires) allow parallel (e.g., concurrent) transmittal of data thereon. The term electrical connection (e.g., bus) may generally refer to one or more separate physical connections, communication lines and/or interfaces, shared connections, and/or point-to-point connections, which may be connected by appropriate bridges, hubs, adapters, and/or controllers. A serial bus (e.g., serial bus architecture) may generally refer to a (e.g., shared) communication channel that transmits data one bit after another (e.g., sequentially), for example, over a (e.g., each) single wire or fiber.

As used herein, the phrase Universal Serial Bus (USB) generally refers to a specification(s) for a serial bus that supports the transmission and reception of data (e.g., and power and/or control) between a downstream facing port (e.g., a host) and one or more upstream facing ports (e.g., devices), for example, through one or more hubs there between.

The embodiments provide a system or platform design that is capable of supporting multiple USB Type-C connectors. Further, the embodiments can employ multiple USB host controllers to improve overall system capabilities related to USB and more specifically to USB Type-C subsystems. As an example, original equipment manufacturers (OEMs) integrate Thunderbolt connectors in their current high-end systems such that these systems have two extensible hose controller interface (XHCI) host controllers (i.e., one host controller is inside the motherboard chipset and one host controller is inside a discrete specialized Thunderbolt connector or, alternatively, one host controller is inside a central processing unit (CPU) or system on a chip (SOC) and one host controller is inside the motherboard chipset). Future system design likely will follow this trend and they will be equipped with multiple USB Type-C connectors supported by multiple USB host controllers. The existing system software architecture based on the simple principle of a single USB host controller being used to manage a fixed set of USB connectors is out dated and the embodiments provide processes and mechanism to accommodate the new hardware changes.

There are three main problems that the embodiments address to improve the versatility of USB connector management. First, the existing system designs have all soldered-down (i.e., physically fixed) USB Type-C connectors (i.e., root ports). On these legacy systems, the soldered-down USB Type-C connectors are managed by, or the 'children,' of a single USB host controller. The legacy system software explicitly assumes that there is a fixed mapping between each USB connector and the USB host controller (i.e., all USB 3.x and USB 2.x connections are mapped to the same USB host controller). However, new system designs supported by the embodiments will allow new types of connectors capable of routing the USB 3.x and USB 2.x signals of each such new connector to an arbitrary USB host controller at any connection time.

The second problem is that the existing legacy system designs allow the USB host controller to be suspended but does not support the USB host controller to be self-hot-removed. Historically, an advance configuration and power interface (ACPI) connector object is part of the USB host controller namespace/scope. The USB host controller being hot removed from the system topology will remove the corresponding ACPI connector object from the system software. The result of removing the ACPI connector object is that OS will be unable to discover the ACPI connector objects during boot (and hence any undiscoverable attribute of the ACPI connector are not available to OS). For example, a legacy OS typically uses the ACPI information for bookkeeping and debugging purposes. If a USB host controller were hot-removed, then the associated information utilized in such book keeping and debugging functions would be lost.

The third problem is that existing legacy system provide no specific mechanism that would be available between the platform firmware (FW), basic input/output system (BIOS) and OS to communicate connector number assignment. This is not an issue with the existing legacy systems because the hardware (HW)/platform design of these systems assumes that all USB Type-C connectors either have identical capabilities or capabilities that can be discovered by the OS driver stack at run time. However, the lack of connector enumeration can be an issue for the system with asymmetric connectors. For example, some new system designs may have specific connectors that can be routed to multiple controllers (e.g., one of several available USB host controllers) to save cost. Without an established connector enumeration scheme the dynamic mapping of multiple hosts to the various connectors cannot be accomplished.

The embodiments encompass system structures and processes to resolve the three problems above and thereby provide more dynamic and flexible system performance for handing new and varied connector type that can be remapped and reconfigured dynamically during system operation. The embodiments add new platform mechanisms to allow USB 3.x and/USB 2.x signals of each connector to be discovered and managed at runtime. The embodiments add new platform mechanisms to ensure the ACPI connection objects are available regardless (i.e., independent) of whether the USB Host controller is part of the system topology. Future operating systems may use ACPI information to discover connector capability related to the platform (e.g., routing capability), which is not discoverable by the existing mechanisms (e.g., via USB-Implementers Forum (IF) defined power deliver (PD) capability or speed up capability discoverable through ACPI). The embodiments add new OS/platform mechanisms that will enable the BIOS and FW to communicate regarding connector assignment to create the associated ACPI object consumable by the OS.

The embodiments define a set of techniques for presenting, to the OS from the platform and firmware, a mapping of the USB Type-C connector to the actual controller (e.g., USB host controller) managing the connector and to port hardware. In an existing legacy system, there is a flat or fixed mapping of all connectors to one controller (i.e., one USB host controller). The embodiments define a set of new techniques to dynamically map the connectors with any of the available controllers (e.g., any available USB host controller) and maximize the capabilities of the system and platform rather than have them limited by fixed mappings. Since existing systems assume a single available controller, the embodiments provide the mechanisms needed to handle new systems that operate with multiple controllers. These existing systems either have soldered-down connectors with fixed mappings or there is only a single connector in the system such is the case with existing tablets and phones, which have only one USB host controller and/or one USB device controller.

The embodiments include a set of processes that support these new system designs with multiple host controller designs.

In one embodiment, a process is provided for host controller/connector discovery and management. The embodiments are described in relation to USB connectors and more specifically USB Type-C connectors. These example embodiments are provided by way of example and not limitation. One skilled in the art would understand that the principles, processes and structures described with relation with USB Type-C connector management are also applicable to other USB connector types and similar connector types managed by similar types of controllers.

When an infrastructure engine (e.g., an embedded controller) is available in the system, the infrastructure engine will report connector number and companion pair information to the BIOS through a platform specific mechanism for each connector sequentially during the initial system boot process. The USB 3 specification requires that each USB 3.x port have a corresponding USB 2.x companion port, such that if a USB 3.x device that is connected to the USB 3 port is downgraded to USB 2, it will be connected to the USB 2 port of the companion pair. This companion pair information will be used by the BIOS to compute/create initial _PLD Group Token/Position field (Physical Device Location method from standard ACPI) to identify companion port information for the OS. The Group token and Group Position fields describe the location of the corresponding connectors on the system. More specifically, the Group token and position field used in the ACPI object is a unique representation of each physical connector in association with its actual controller and port. The _PLD object and the USB port capabilities (_UPC) object are data structures used to define the characteristics of a port configuration. These data structures are defined via ACPI.

When an infrastructure engine is not available in the system, the BIOS will communicate to the platform directly during the boot up process to determine the equivalent mapping information for each connector.

Table I provides an example of connector number, port companion and _PLD configuration for a system with 4 connectors.

TABLE I

| Connector number reported by infrastructure engine (example shown here for 4 connectors) | USB Port companion pair (USB2/USB3) of Host Controller X and Y | _PLD Group token and position of ACPI Connector Object CN0x to be created under OPM Scope |
|---|---|---|
| 1 | X1, Y3 | Fx(1, X1, Y3) |
| 2 | X2, Y4 | Fx(2, X2, Y4) |
| 3 | X3, Y1 | Fx(3, X3, Y1) |
| 4 | X4, Y2 | Fx(4, X4, Y2) |

In the table, the connector number is a unique identifier for each connector in the system. In this example, with four connectors, they are numbered consecutively from 1 to 4. However, any enumeration is possible. Each connector is associated with a USB port companion pair. In this example, the system includes two USB host controllers (USB host controller X and USB host controller Y). The number associated with each companion pair (e.g., X1 or Y3 is an indicator or a port). The _PLD group token and the position of the ACPI connector object that is provided to the operating system policy manager (OPM) is a grouping of the connector number and USB port companion pair. CN0x is a label for the a given connector object and Fx (n, X, Y) is a function that prepares a unique PLD package for connector N, with a Group Token X and Group Position Y, thereby identifying the correspondence between the connector and the two controllers X and Y.

To support new hardware (HW) power management capabilities like support for self-hot removal when a controller is idle, the Connector ACPI objects are created under the OPM. The OPM, in some embodiments, can be the OPM defined in the USB-IF USB Type-C System Software Interface specification. Altering the ACPI object scope to place it with the OPM ensures that the connector object will be available in the system wide hardware topology regardless of whether the USB host controller is present or not (e.g., after it has self-hot removed). The embodiments may utilize a OS specific application programmable interface (API) for OS components/driver stacks (e.g., USB, Display, charging and similar stacks) to access the connector object under the OPM scope. For those USB ports of USB Host Controller X and Y that are not being routed to any USB Type-C connector, it will be the responsibility of the platform FW/BIOS to mark these ports as un-connectable/invisible (based on the requirements of the specific OS).

Sample ACPI source language (ASL) code for OPM connector objects:

```
OPM ACPI Namespace:
Device (CR01) {
    Name (_ADR, 0x1)
    // Group token/Position is computed based on connector number reported
    // by the Infrastructure Engine. The initial result is saved in the memory buffer
    // buffer to allow any potential modification
    //
    // Note that Fx(1, X, Y) is the memory buffer used initially at boot
    // time. This buffer can be modified by platform FW/BIOS subsequently after by
    // boot if dynamic evaluation is needed
    // Group_Token_position = Fx(1, X1, Y3)
    Method(_PLD) { Return Fx(1, X1, Y3)}
    Name(_UPC, Package( ) {
        0x01,        // Port is connectable
        0x09,        // Type-C connector - USB2 and SuperSpeed (SS) with
        Switch
        0x00000000,
        0x00000000})
} // Device (CR01)
```

FIG. 1 is a diagram of the platform demonstrating a static assignment of connectors to a USB host controller at system start up. This diagram illustrates elements of the system and platform that are relevant to the enhanced mapping features for connectors and controllers described herein. One skilled in the art would understand that there are additional components and structures that have not been illustrated for sake of clarity and conciseness. The diagram illustrates the interconnection of the OS USB driver stack 101, BIOS 103, connectors 107A,B, infrastructure engine and USB controllers 115A, B. The OS USB driver stack 101 is the software stack within the operating system that manages connected USB devices. The OS USB driver stack 101 can be a part of the OS policy manager 127. The OS policy manager 127 manages the interface between applications and drivers for connection interfaces. The BIOS 103 manages system start-up and general device connection management. The BIOS 103 and OS USB driver stack 101 interact via ACPI. The example of FIG. 1 shows a system where an infrastructure engine (e.g., implemented in an embedded controller) 105 is present. The embedded controller and/or infrastructure engine 105 facilitate communication with the connectors 107 and ports of the system. The connectors 107 in this connect are the connection between the system and the USB infrastructure. The ports are the connections between the USB infrastructure and the devices. The connectors 107 can be USB Type-C connectors.

The USB infrastructure can include mapping device 113 or group multiplexor that connects the connectors 107 A, B with another level of downstream facing port (DFP)/upstream facing port (UFP) multiplexors 111 that enable communication between the physical ports and the connectors 107. The DFP/UFP multiplexors 111 connect with physical ports controlled by USB controllers 115A, B. The USB controllers 115 A, B encompass USB host controllers 117A, B and USB device controllers 119A, B. USB host controllers 117A, B manage communication through the physical ports where the system is the USB host and the USB device controllers manage communication through the physical ports where the system is the USB device. In some embodiments, these physical ports are USB Type-C. The USB controller in the illustrated example includes two sets of controllers referred to as USB blocks X and Y, each with corresponding USB host controllers X and Y and USB device controllers X and Y, respectively.

With the process of static routing at startup, the connector 107 to USB host controller 117A, B routing is fixed after it is assigned (i.e., it cannot be modified during runtime). In this embodiment, since the connector 107 A, B to USB host controller 117A, B mapping does not change after boot/start (i.e., after it is assigned), the ACPI Host controller USB port object can simply return _PLD and _UPC information defined under the corresponding connector 107A, B of the OPM 127 upon request from the OS driver stack 101. The OS driver stack 101 can either save connector mapping results during driver initialization time for later reference or dynamically evaluate mapping at run time when this information is needed.

Sample corresponding ASL code for Host Controller namespace:

```
Host controller X namespace
Device(X1) {
    Name(_ADR, 0x5)
    Method(_PLD) { Return (\_SB.UBTC.CR01._PLD) }
    Method(_UPC) { Return (\_SB.UBTC.CR01._UPC) }
}
Host controller Y namespace
Device(Y3) {
    Name(_ADR, 0x3)
    Method(_PLD) { Return (\_SB.UBTC.CR01._PLD) }
    Method(_UPC) { Return (\_SB.UBTC.CR01._UPC) }
}
```

The example code here shows the mapping of the physical ports circled in the diagram to the connector 107A circled in the diagram. This mapping is encoded in the USB host controller X 117A and USB host controller Y 117B respective namespace including in the associated _PLD and _UPC. This information is compiled at boot time by a device mapping function 125 that may be implemented by either BIOS 103 or the infrastructure engine 105.

Figure 2:
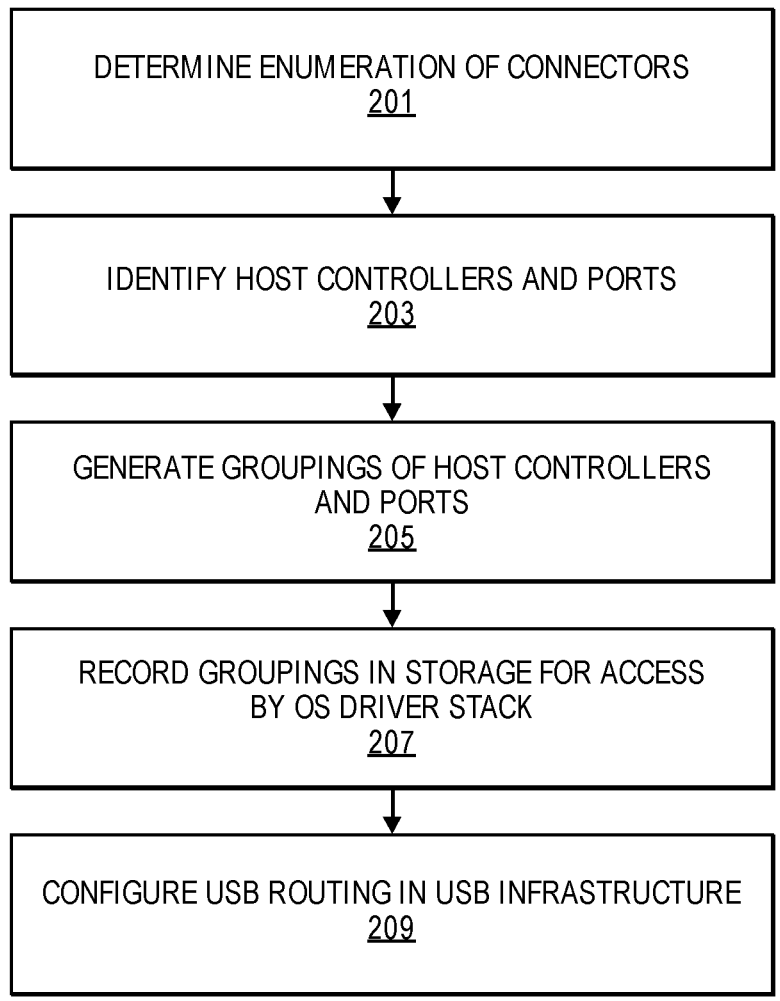
FIG. 2 is a diagram of one embodiment of a process for recording the static connector mapping.

FIG. 2 is a diagram of one embodiment of a process for recording the static connector mapping. In one embodiment, at system start up a device mapper, implemented either as a function of the embedded controller (i.e., the infrastructure engine) or the BIOS can generate the information needed for the OS driver stack to determine connector to USB host controller mappings by querying to receive _PLD and _UPC information. The process may begin with the enumeration of the connectors in the system (Block 201). The enumeration may be performed by other functions, but is utilized by the mapping function. The mapping function also identifies the host controllers and ports that are present in the system (Block 203). The identification of host controller can be based on information provided by the USB controller. The information provided can include port characteristics (e.g., USB 2, USB 3, SS and similar characteristics).

With the reported information, the groupings of the USB host controllers and connectors can be determined (Block 205). The groupings can be encoded as group tokens/positions and stored in a buffer to enable an OS driver stack to utilize an ACPI query to determine the mappings in the _PLD and _UPC information. Similarly, the grouping information can be utilized to configure the USB infrastructure including the group multiplexor, DFP/UFP and similar components.

Figure 3:
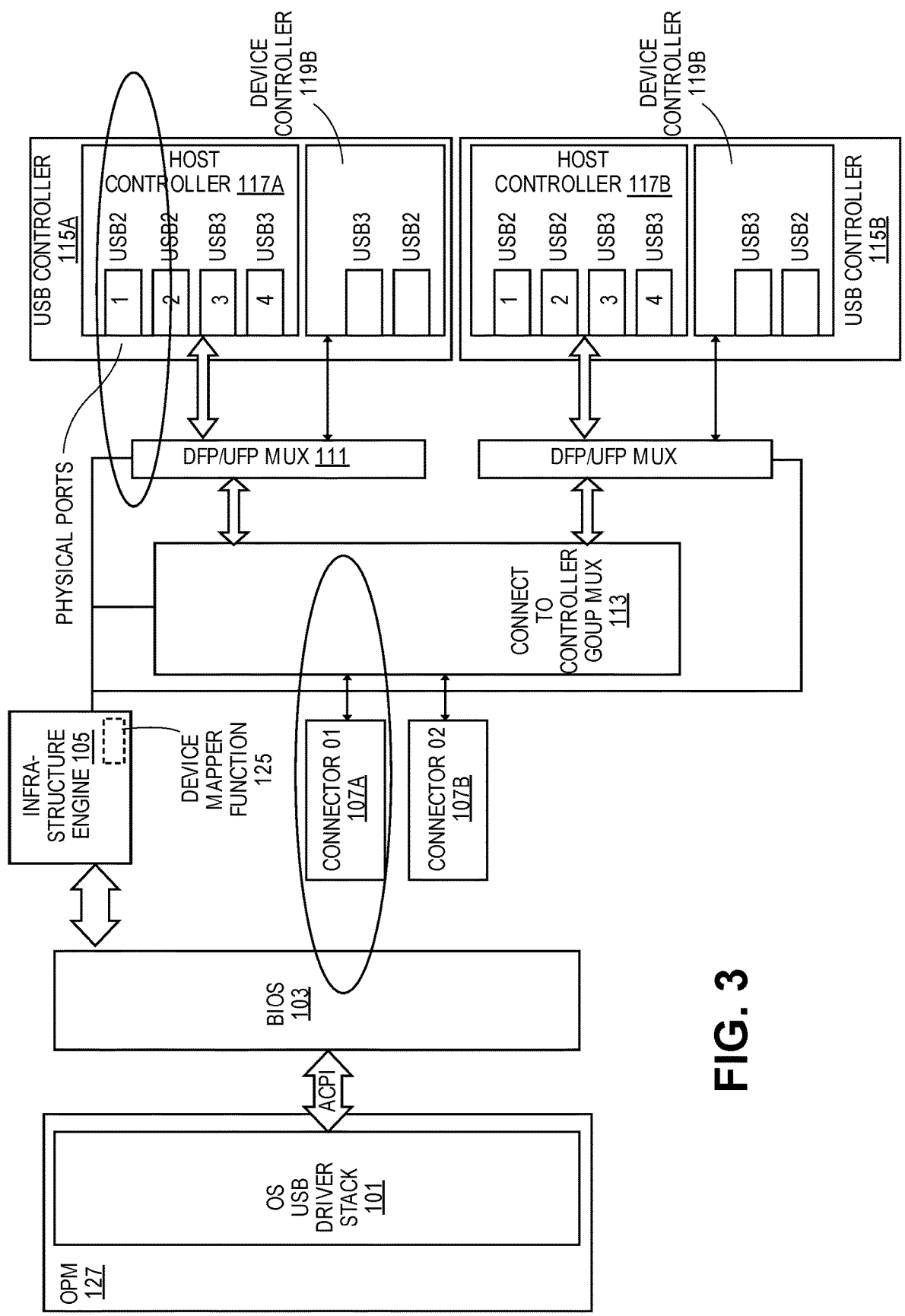
FIG. 3 is a diagram of the platform demonstrating a dynamic assignment of connectors to a USB host controller at system start up.

FIG. 3 is a diagram of the platform demonstrating a dynamic assignment of connectors to a USB host controller at system start up. This diagram illustrates elements of the system and platform that are relevant to the enhanced mapping features for connectors and controllers described herein. One skilled in the art would understand that there are additional components and structures that have not been illustrated for sake of clarity and conciseness. FIG. 3 illustrates assignment of connectors 107A, B to USB host controller block 115A, B routing at run time where an infrastructure engine 105 is present in the system. In this embodiment, the connector 107A, B to USB host controller 117A, B routing can be modified (by the embedded controller and infrastructure engine 105) based on platform policy after the mapping is assigned. In this embodiment, since the connector mapping can be changed after boot, the ACPI _PLD object for the USB host controller 117A, B that is under a corresponding USB port scope (i.e., representing port routing information between USB host controller 117A, B and connector 107A, B) can be updated by the infrastructure engine 105 to reflect a change in the USB routing when there is a new USB connection. This information will be re-evaluated at run time such that the OS driver stack 101 can determine the current routing (e.g. by comparing _PLD of the USB port and _PLD of the connector).

Sample corresponding ASL code for Host Controller namespace:

```
Host controller X namespace
Device(X1) {
    Name(_ADR, 0x5)
    Method(_PLD) { Return (TPLD(1,Gx(1, X1, Y3))))}
}
Host controller Y namespace
Device(Y3) {
    Name(_ADR, 0x3)
    Method(_PLD) { Return (TPLD(1,Gx(1, X1., Y3))))}
}
```

The example code here shows the mapping of the physical ports circled in the diagram to the connector 107A circled in the diagram. This mapping is encoded in the USB host controller X 117A and USB host controller Y 117B respective namespace including in the associated _PLD and _UPC. This information is being updated at runtime by a device mapping function 125 that may be implemented by the infrastructure engine 105 and/or embedded controller.

Figure 4:
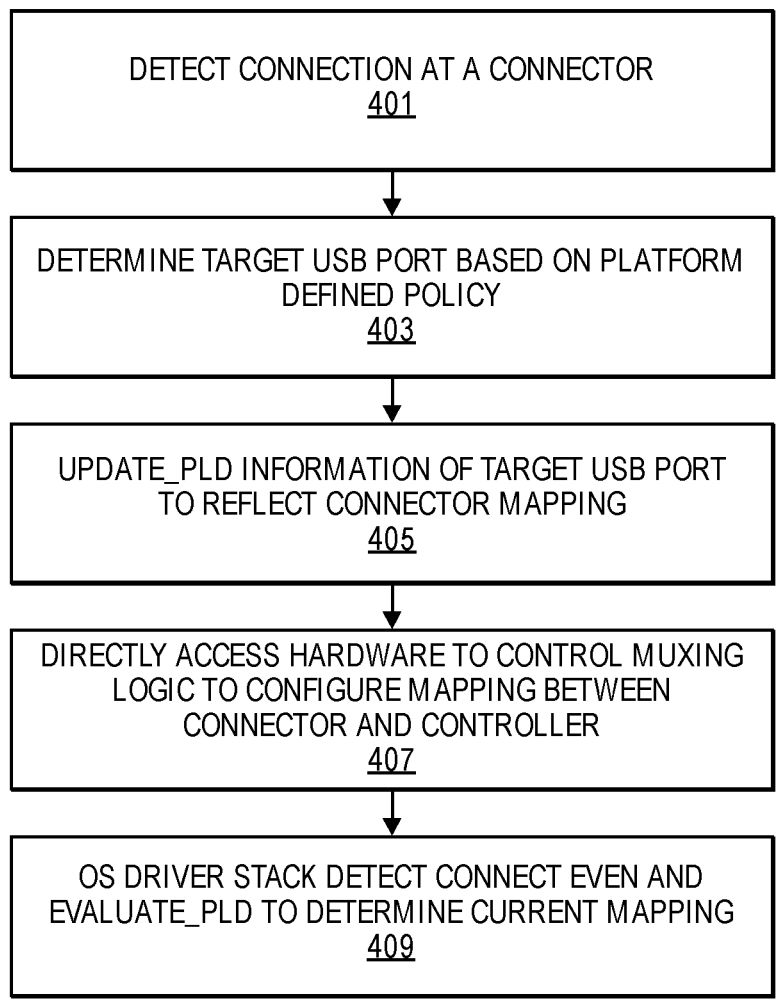
FIG. 4 is a flowchart of one embodiment of the device mapping function to map host controllers to connectors dynamically during runtime.

FIG. 4 is a flowchart of one embodiment of the device mapping function to map host controllers to connectors dynamically during runtime. The device mapper 125 in the infrastructure engine 105 will follow these steps to update/configure the mapping. In one embodiment, the dynamic update process is initiated in response to the infrastructure engine detecting a connection at a connector (Block 401). Connectors can signal in any manner that a new connection has occurred to the embedded controller and infrastructure engine. Upon receipt of the notification of the connection, the infrastructure engine determines a target USB port, a port or set of ports to map the connector to, based on platform defined policy (Block 403). The platform defined policy can be embedded controller firmware that can provide the ideal connector to port mapping on a given system. Target USB port is the recommended port that is provided by the platform policy. Once the target USB port is identified, then the infrastructure engine updates the _PLD information of the target USB port to reflect the connector mapping (e.g., a function Gx(PortId) that provides a unique value for every physical PortID) may be associated with the USB port _PLD) (Block 405).

The infrastructure engine directly access the hardware of the USB infrastructure to control muxing logic to configure mapping between the connector and the USB host controller that has been selected (Block 407). The infrastructure engine can directly signal the group multiplexor, DFP/UFP multiplexors and similar USB infrastructure to connect the connector and the USB host controller and ports per the mapping determined by the USB infrastructure (Block 407). The OS driver stack receives notification or similarly detects a connect event and evaluates the _PLD of the connector and USB port to determine current mapping (i.e., by comparing the _PLD of the USB port and _PLD of the connector) (Block 409).

Figure 5:
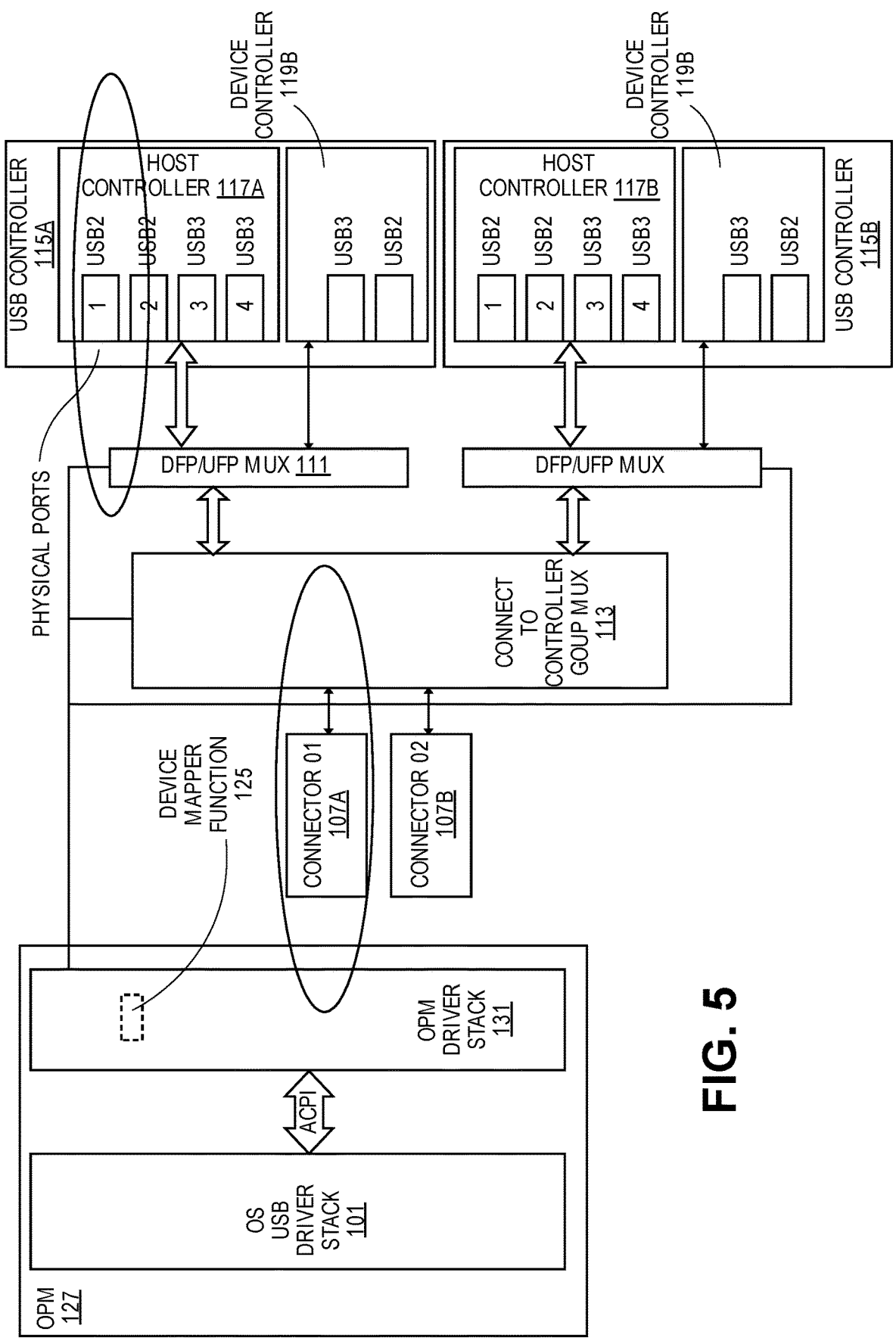
FIG. 5 is a diagram of the platform demonstrating a dynamic assignment of connectors to a USB host controller at run time.

FIG. 5 is a diagram of the platform demonstrating a dynamic assignment of connectors to a USB host controller at run time. This diagram illustrates elements of the system and platform that are relevant to the enhanced mapping features for connectors and controllers described herein. One skilled in the art would understand that there are additional components and structures that have not been illustrated for sake of clarity and conciseness. FIG. 5 illustrates assignment of connectors 107A, B to USB host controller block 115A, B routing at runtime where an infrastructure engine is not present in the system. In this embodiment, the connector 107A, B to USB host controller 117A, B routing can be modified (by the OPM driver stack 129) based on platform policy after the mapping is assigned.

Since there is no infrastructure engine in this embodiment, it is the responsibility of the OPM driver stack 131 to discover and manage connector routing. The connector 107A, B to USB host controller 117A, B routing will be assigned at boot time and can be modified by OPM driver stack 131 based on driver capability. In this embodiment, since the connector mapping can be changed after boot, the ACPI _PLD object for the USB host controller 117A, B that is under a corresponding USB port scope (i.e., representing port routing information between USB host controller 117A, B and connector 107A, B) can be updated by the OPM driver stack 131 to reflect a change in the USB routing when there is a new USB connection. This information will be re-evaluated at run time such that the OS driver stack 101 can determine the current routing (e.g. by comparing _PLD of the USB port and _PLD of the connector).

Figure 6:
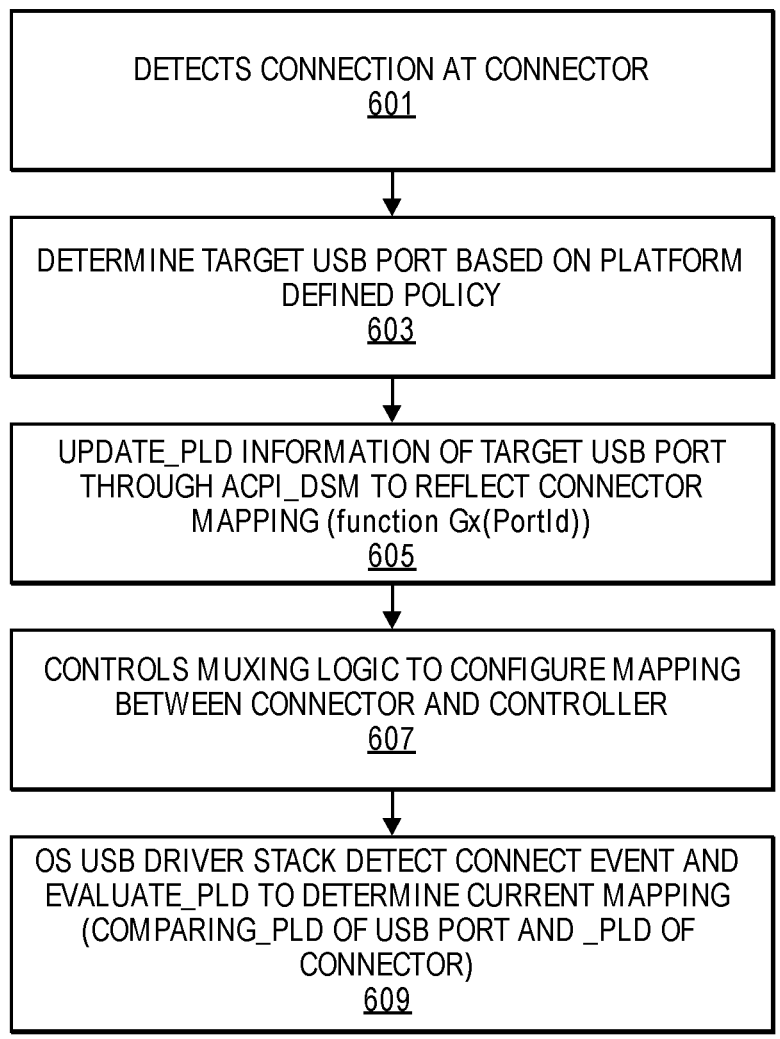
FIG. 6 is a flowchart of one embodiment of the device mapping function to map host controllers to connectors dynamically during runtime.

FIG. 6 is a flowchart of one embodiment of the device mapping function to map host controllers to connectors dynamically during runtime. The device mapper in the OPM driver stack will follow these steps to update/configure the mapping. The OPM driver stack will detect a connection at the connector (Block 601). Connectors can signal in any manner that a new connection has occurred to the OS driver stack. Upon receipt of the notification of the connection, the OPM driver stack can determine a target USB port based on a platform defined policy (Block 603). The OPM driver stack can update _PLD information of the target USB port through ACPI_DSM (device specific method) to reflect connector mapping (e.g., function Gx(PortId)) (Block 605). The OPM driver stack controls the muxing logic to configure mapping between the selected connector and USB host controller (Block 607). The OS USB driver stack detects connection events and evaluates _PLD to determines the current mapping between the connectors and USB ports by comparing the _PLD of the USB port and the _PLD of connector (Block 609).

The embodiments of the system include systems where the operating system aspects are executed by a central processing unit (CPU). The CPU can be part of a system on a chip (SOC) that includes a processor or set of processors and internal interconnects that are illustrated in further embodiments below with regard to FIGS. 7 and 8, which illustrate and describe the hardware components of SOCs. In other embodiments, the system can have a set of processors that are connected via an I/O chipset with the USB infrastructure and BIOS. A 'set,' as used herein refers to any positive whole number of items including one item.

As mentioned above, with regard to FIGS. 1, 3 and 5, the computing system is illustrated with abstraction to show those components relevant to the processes for the configuration of USB host and connector mapping.

In certain embodiments, a first device may connect to a second device through a (e.g., wired) electrical connection, for example, a serial bus cable having multiple conductors (e.g., wires). A cable may include a plug, e.g., on each end thereof. A receptacle of a device (or a plug of a device) may receive a plug (or receptacle) coupled to another device. In one embodiment, a plug may be received (e.g., inserted) into a receptacle in a plurality of orientations, for example, flipped from one orientation to another orientation, e.g., and retain its (e.g., full) functions. This may be referred to as "flip-ability", e.g., flip-able between a right-side up position and an upside-down position.

Certain embodiments (for example, with one or more flip-able plug and receptacle pairs) may allow a first device and/or a second device to toggle between different roles, for example, as the devices wait for a physical connection to be made and each device's role to be established, e.g., in contrast to a connector's type defining a role, such as a type-A USB connector being a host (data master) role and a type-B USB connector being a slave (data recipient) role. In certain embodiments herein, a first device may be in a first role (e.g., an upstream facing data port role, downstream facing data port role, power source role, and/or power sink role) and a second device in a second (e.g., same or different than the first) role (e.g., an upstream facing data port role, downstream facing data port role, power source role, and/or power sink role). In one embodiment, a device (e.g., a circuit thereof) presents itself (e.g., during initial attachment) as a first of a plurality of roles, then changes to a second of a plurality of roles, etc. In one embodiment, a device (e.g., a circuit thereof) presents itself (e.g., during initial attachment) as a first role, then toggles to a second role, then back to the first role, for example, and continues to do so, e.g., until the other device acknowledges that role (e.g., via an acknowledgement signal). For example, a current USB Type-C specification (e.g., revision 1.2 of Mar. 25, 2016) and a current USB Power Delivery specification (e.g., revision 3.0, version 1.0a of Mar. 25, 2016) includes an upstream facing data port role (e.g., a host) and a downstream facing data port role for each device (e.g., a USB device) and/or a power source role and a power sink role. In one embodiment, a device in the power source role (e.g., that acquires the power source role) is also in the downstream facing data port role, for example, until an operation is performed to swap one or more of the device's roles (e.g., to perform a power role swap to swap the current power role but retain the current data role, to perform a data role swap to swap the current data role but retain the current power role, or to perform a role swap of both the data and power roles). In one embodiment, a device in the power sink role (e.g., that acquires the power sink role) is also in the upstream facing data port role, for example, until an operation is performed to swap one or more of the device's roles (e.g., to perform a power role swap to swap the current power role but retain the current data role, to perform a data role swap to swap the current data role but retain the current power role, or to perform a role swap of both the data and power roles).

In certain embodiments, a first device with multiple (e.g., dual) roles may connect to a second device with multiple (e.g., dual) roles (for example, where each device's role is not defined by the connector (e.g., a plug or receptacle thereof) type, e.g., two devices connected by a cable that has the same plug at each end). In embodiments, each device may present itself in the same role, for example, where the devices do not connect to each other, e.g., do not connect from a user's perspective or with respect to a communication protocol (for example, electrically and/or physically connected devices that do not allow data and/or power transmission or reception, e.g., other than communications to define a device's role). Certain devices (e.g., operating according to specification(s) or industry standards) do not have predefined roles, for example, each device is to establish its role, for example, or it does not function, e.g., to transmit and receive data and/or source and sink power. Certain devices (e.g., operating according to specification(s) or industry standards) do not define device role(s), for example, in the point-to-point connection by the connector type, e.g., to accept and provide power and/or data with an externally connected device (e.g., a laptop connected to phone, a laptop connected to an external (e.g., USB drive), a phone connected to tablet, etc.).

For example, each device of a plurality of devices may include a same connector (e.g., plug or receptacle thereof), for example, such that circuitry is to cause signaling (e.g., between connected devices) while the connections are physically made (e.g., during an initialization phase) in order to define the role(s) of each device, for example, one device as a host and another device as a slave and/or one device as a power source (e.g., provider) and another device as the power sink (e.g., consumer). In certain embodiments, devices that toggle (e.g., switch) between either of a plurality of roles (e.g., a dual role device) are to toggle (e.g., via a toggling circuit) back and forth between a plurality of roles, for example, (e.g., only) between an upstream facing data port role (e.g., slave or device role) and a downstream facing data port role (e.g., host role). Device(s) may toggle between a plurality of roles until a specific (e.g., stable) state is established, for example, during a connection process (e.g., initial attach). A multiple (e.g., dual) role device may connect to a fixed role device or another multiple (e.g., dual) role device. In one embodiment, both devices are capable of the same (e.g., pair of) roles. In one embodiment, both multiple (e.g., dual) role devices (e.g., the ports thereof) are toggling between a first role and a second role (for example, via one or more of each device's configuration channels (e.g., each device's CC1 and CC2 pins)) at (e.g., substantially) the same frequency (e.g., time rate) and/or duty cycle. Thus, in certain embodiments, a physical connection is made (e.g., with a USB Type-C cable) between two or more multiple role devices but none of the devices detects the signaling to define a role (e.g., no device detects a signaling event or sends a response to acknowledge the signaling event).

Certain embodiments herein provide for a randomization of one or both of multiple role device's toggling frequency and its toggling duty cycle, for example, to minimize the probability of in sync toggling. Certain embodiments herein provide for a randomization of one or both of multiple role device's toggling frequency and its duty cycle during each cycle of toggling between different device roles. Certain embodiments herein randomize a multiple (e.g., dual) role device's toggling frequency and duty cycle, e.g., to vary the high and low times of the toggling, to reduce or eliminate the possibility of two (e.g., unique) separate devices having the same timings, e.g., over a plurality of cycles. Certain embodiments herein provide for one or more multiple (e.g., dual) role devices connected together to resolve their upstream facing data port role and downstream facing data port role and/or their power source role and power sink role faster than without randomization, e.g., as the likelihood all (e.g., both) devices are asserting (e.g., displaying) the same role at the same time is reduced (e.g., lower) or eliminated. Certain embodiments herein add more randomization to the toggling frequency and/or duty cycle of a device asserting each role indicator than a device with a fixed duty cycle and/or frequency of toggling, e.g., more randomization than a substantially fixed toggling duty cycle and/or a substantially fixed frequency of toggling that rely only on the inaccuracy (e.g., according to manufacturing tolerances) of internal timers or oscillators to provide variance (e.g., misalignment) to resolve roles and avoid the case where the toggling is in sync. Certain embodiments herein reduce role resolution times as well as reduce or avoid any occurrences where neither device sees the role defining event (e.g., a cable and/or plug insertion event). Certain embodiments herein reduce (e.g., to the end user) the resolution time significantly, e.g., the overall time from connection of the devices to usability (e.g., to allow payload data to be transmitted and received, e.g., and not role merely role resolution data transmission and receipt) is shorter.

Figure 7:
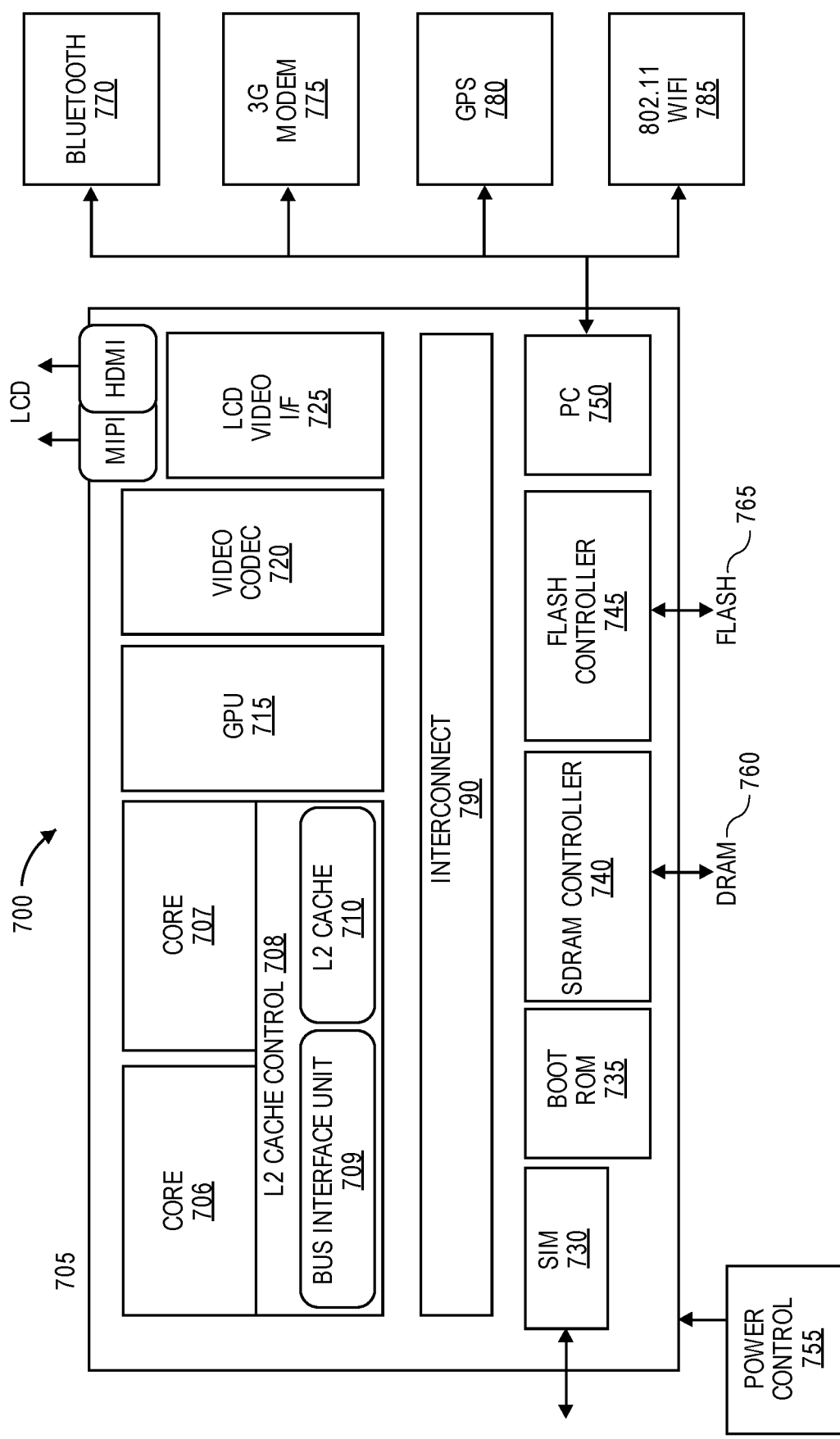
FIG. 7 is a diagram of one embodiment of a system on a chip (SOC) that may implement aspects of the embodiments.

FIG. 7 is a diagram of one embodiment of a system on-chip (SOC) design that may be utilized to implement the embodiments. As a specific illustrative example, SOC 700 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 700 includes 2 cores—706 and 707. Similar to the discussion above, cores 706 and 707 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 706 and 707 are coupled to cache control 708 that is associated with bus interface unit 709 and L2 cache 710 to communicate with other parts of system 700. Interconnect 790 includes an on-chip interconnect, such as an IOSF, AMBA, or other interconnect discussed above, which potentially implements one or more aspects of the described embodiments.

Interconnect 790 provides communication channels to the other components, such as a Subscriber Identity Module (SIM) 730 to interface with a SIM card, a boot ROM 735 to hold boot code for execution by cores 706 and 707 to initialize and boot SOC 700, a SDRAM controller 740 to interface with external memory (e.g. DRAM 760), a flash controller 745 to interface with non-volatile memory (e.g. Flash 765), a peripheral control 750 (e.g. Serial Peripheral Interface) to interface with peripherals, video codecs 720 and Video interface 725 to display and receive input (e.g. touch enabled input), GPU 715 to perform graphics related computations, etc. Any of these interfaces may incorporate aspects of the embodiments described herein.

In addition, the system illustrates peripherals for communication, such as a Bluetooth module 770, 3G modem 775, GPS 780, and WiFi 785. Note as stated above, a UE includes a radio for communication. As a result, these peripheral communication modules are not all required. However, in a UE some form a radio for external communication is to be included.

Note that the apparatus, methods, and systems described above may be implemented in any electronic device or system as aforementioned. As specific illustrations, the FIGS. 7-12 provide exemplary systems for utilizing the embodiments as described herein. As the systems below are described in more detail, a number of different interconnects are disclosed, described, and revisited from the discussion above. And as is readily apparent, the advances described above may be applied to any of those interconnects, fabrics, or architectures.

Figure 8:
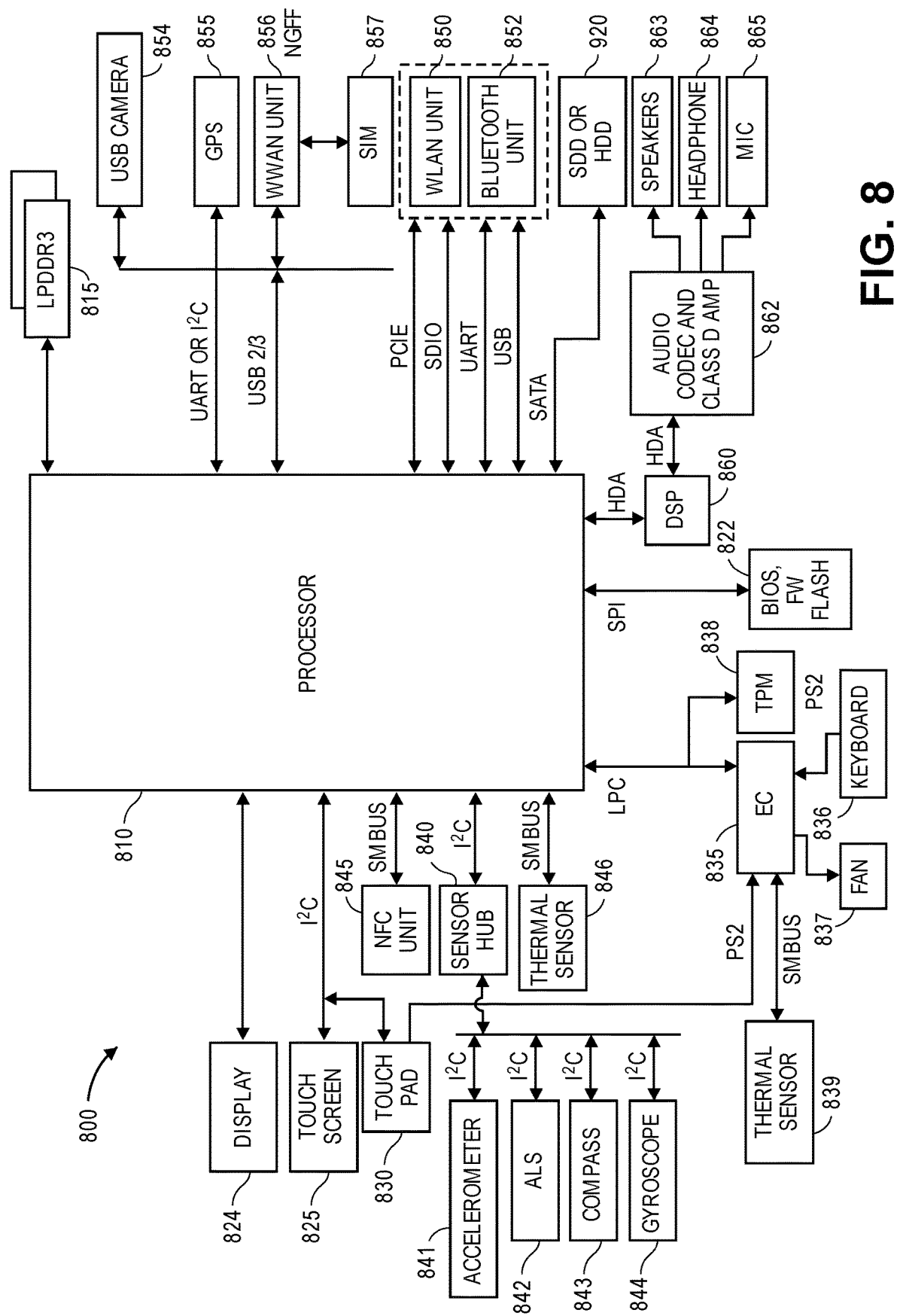
FIG. 8 is a diagram of computing system including the SOC and components that implemented the embodiments.

FIG. 8 a block diagram of components present in a computer system as an example implementation of the components of the embodiments. As shown in FIG. 8, system 800 includes any combination of components. These components may be implemented as integrated circuits (ICs), portions thereof, discrete electronic devices, or other modules, logic, hardware, software, firmware, or a combination thereof adapted in a computer system, or as components otherwise incorporated within a chassis of the computer system. Note also that the block diagram of FIG. 8 is intended to show a high level view of many components of the computer system. However, it is to be understood that some of the components shown may be omitted, additional components may be present, and different arrangement of the components shown may occur in other implementations. As a result, the embodiments described above may be implemented in any portion of one or more of the interconnects illustrated or described below.

As seen in FIG. 8, a processor 810, in one embodiment, includes a microprocessor, multi-core processor, multi-threaded processor, an ultra-low voltage processor, an embedded processor, or other known processing element. In the illustrated implementation, processor 810 acts as a main processing unit and central hub for communication with many of the various components of the system 800. As one example, processor 810 is implemented as a system on a chip (SoC). As a specific illustrative example, processor 810 includes an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instructions set that performs defined algorithms as set forth by the processor licensor. Here, the microarchitectural implementation may vary, but the architectural function of the processor is usually consistent. Certain details regarding the architecture and operation of processor 810 in one implementation will be discussed further below to provide an illustrative example.

Processor 810, in one embodiment, communicates with a system memory 815. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2011), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (Q17P). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 820 may also couple to processor 810. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 8, a flash device 822 may be coupled to processor 810, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in a mSATA or NGFF slot. As an example, an SSD has a capacity ranging from 120 GB-1 TB.

Various input/output (TO) devices may be present within system 800. Specifically shown in the embodiment of FIG. 8 is a display 824 which may be a high definition LCD or LED panel configured within a lid portion of the chassis. This display panel may also provide for a touch screen 825, e.g., adapted externally over the display panel such that via a user's interaction with this touch screen, user inputs can be provided to the system to enable desired operations, e.g., with regard to the display of information, accessing of information and so forth. In one embodiment, display 824 may be coupled to processor 810 via a display interconnect that can be implemented as a high performance graphics interconnect. Touch screen 825 may be coupled to processor 810 via another interconnect, which in an embodiment can be an I$^2$C interconnect. As further shown in FIG. 8, in addition to touch screen 825, user input by way of touch can also occur via a touch pad 830 which may be configured within the chassis and may also be coupled to the same I$^2$C interconnect as touch screen 825.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920×1080p), be compatible with an embedded display port (eDP), and be a low power panel with panel self-refresh.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating (e.g., Gorilla Glass™ or Gorilla Glass 2) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited IO interference when using multi-touch.

For perceptual computing and other purposes, various sensors may be present within the system and may be coupled to processor 810 in different manners. Certain inertial and environmental sensors may couple to processor 810 through a sensor hub 840, e.g., via an I$^2$C interconnect. In the embodiment shown in FIG. 8, these sensors may include an accelerometer 841, an ambient light sensor (ALS) 842, a compass 843 and a gyroscope 844. Other environmental sensors may include one or more thermal sensors 846 which in some embodiments couple to processor 810 via a system management bus (SMBus) bus.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra-idle power to enable applications to remain connected, e.g., to a cloud-based location, at very low power consumption. The platform can support 3 power states, namely screen on (normal); Connected Standby (as a default "off" state); and shutdown (zero watts of power consumption). Thus in the Connected Standby state, the platform is logically on (at minimal power levels) even though the screen is off In such a platform, power management can be made to be transparent to applications and maintain constant connectivity, in part due to offload technology to enable the lowest powered component to perform an operation.

Also seen in FIG. 8, various peripheral devices may couple to processor 810 via a low pin count (LPC) interconnect. In the embodiment shown, various components can be coupled through an embedded controller (EC) 835. Such components can include a keyboard 836 (e.g., coupled via a PS2 interface), a fan 837, and a thermal sensor 839. In some embodiments, touch pad 830 may also couple to EC 835 via a PS2 interface. In addition, a security processor such as a trusted platform module (TPM) 838 in accordance with the Trusted Computing Group (TCG) TPM Specification Version 1.2, dated Oct. 2, 2003, may also couple to processor 810 via this LPC interconnect. However, understand the scope of the present disclosure is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with a Universal Serial Bus specification, with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 800 can communicate with external devices in a variety of manners, including wirelessly. In the embodiment shown in FIG. 8, various wireless modules, each of which can correspond to a radio configured for a particular wireless communication protocol, are present. One manner for wireless communication in a short range such as a near field may be via a near field communication (NFC) unit 845 which may communicate, in one embodiment with processor 810 via an SMBus. Note that via this NFC unit 845, devices in close proximity to each other can communicate. For example, a user can enable system 800 to communicate with another (e.g.,) portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 8, additional wireless units can include other short range wireless engines including a WLAN unit 850 and a Bluetooth unit 852. Using WLAN unit 850, Wi-Fi™ communications in accordance with a given Institute of Electrical and Electronics Engineers (IEEE) 802.11 standard can be realized, while via Bluetooth unit 852, short range communications via a Bluetooth protocol can occur. These units may communicate with processor 810 via, e.g., a USB link or a universal asynchronous receiver transmitter (UART) link. Or these units may couple to processor 810 via an interconnect according to a Peripheral Component Interconnect Express™ (PCIe™) protocol, e.g., in accordance with the PCI Express™ Specification Base Specification version 3.0 (published Nov. 10, 2010), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 856 which in turn may couple to a subscriber identity module (SIM) 857. In addition, to enable receipt and use of location information, a GPS module 855 may also be present. Note that in the embodiment shown in FIG. 8, WWAN unit 856 and an integrated capture device such as a camera module 854 may communicate via a given USB protocol, e.g., USB 2.0 or 3.0 link, or a UART or I²C protocol. Again the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition NFC support may be provided via a separate device or multi-function device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 860, which may couple to processor 810 via a high definition audio (HDA) link. Similarly, DSP 860 may communicate with an integrated coder/decoder (CODEC) and amplifier 862 that in turn may couple to output speakers 863 which may be implemented within the chassis. Similarly, amplifier and CODEC 862 can be coupled to receive audio inputs from a microphone 865 which in an embodiment can be implemented via dual array microphones (such as a digital microphone array) to provide for high quality audio inputs to enable voice-activated control of various operations within the system. Note also that audio outputs can be provided from amplifier/CODEC 862 to a headphone jack 864. Although shown with these particular components in the embodiment of FIG. 8, understand the scope of the present disclosure is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 810 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC 835. This sustain power plane also powers an on-die voltage regulator that supports the on-board SRAM or other cache memory in which the processor context is stored during the sleep state. The sustain power plane is also used to power on the processor's wakeup logic that monitors and processes the various wakeup source signals.

During power management, while other power planes are powered down or off when the processor enters certain deep sleep states, the sustain power plane remains powered on to support the above-referenced components. However, this can lead to unnecessary power consumption or dissipation when those components are not needed. To this end, embodiments may provide a connected standby sleep state to maintain processor context using a dedicated power plane. In one embodiment, the connected standby sleep state facilitates processor wakeup using resources of a PCH which itself may be present in a package with the processor. In one embodiment, the connected standby sleep state facilitates sustaining processor architectural functions in the PCH until processor wakeup, this enabling turning off all of the unnecessary processor components that were previously left powered on during deep sleep states, including turning off all of the clocks. In one embodiment, the PCH contains a time stamp counter (TSC) and connected standby logic for controlling the system during the connected standby state. The integrated voltage regulator for the sustain power plane may reside on the PCH as well.

In an embodiment, during the connected standby state, an integrated voltage regulator may function as a dedicated power plane that remains powered on to support the dedicated cache memory in which the processor context is stored such as critical state variables when the processor enters the deep sleep states and connected standby state. This critical state may include state variables associated with the architectural, micro-architectural, debug state, and/or similar state variables associated with the processor.

The wakeup source signals from EC 1635 may be sent to the PCH instead of the processor during the connected standby state so that the PCH can manage the wakeup processing instead of the processor. In addition, the TSC is maintained in the PCH to facilitate sustaining processor architectural functions.

Power control in the processor can lead to enhanced power savings. For example, power can be dynamically allocated between cores, individual cores can change frequency/voltage, and multiple deep low power states can be provided to enable very low power consumption. In addition, dynamic control of the cores or independent core portions can provide for reduced power consumption by powering off components when they are not being used.

Some implementations may provide a specific power management IC (PMIC) to control platform power. Using this solution, a system may see very low (e.g., less than 5%) battery degradation over an extended duration (e.g., 16 hours) when in a given standby state, such as when in a Win8 Connected Standby state. In a Win8 idle state a battery life exceeding, e.g., 9 hours may be realized (e.g., at 150 nits). As to video playback, a long battery life can be realized, e.g., full HD video playback can occur for a minimum of 6 hours. A platform in one implementation may have an energy capacity of, e.g., 35 watt hours (Whr) for a Win8 CS using an SSD and (e.g.,) 40-44 Whr for Win8 CS using an HDD with a RST cache configuration.

A particular implementation may provide support for 15 W nominal CPU thermal design power (TDP), with a configurable CPU TDP of up to approximately 25 W TDP design point. The platform may include minimal vents owing to the thermal features described above. In addition, the platform is pillow-friendly (in that no hot air is blowing at the user). Different maximum temperature points can be realized depending on the chassis material. In one implementation of a plastic chassis (at least having to lid or base portion of plastic), the maximum operating temperature can be 52 degrees Celsius (C). And for an implementation of a metal chassis, the maximum operating temperature can be 46° C.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

Embodiments (e.g., of the mechanisms) disclosed herein may be implemented in hardware (e.g., a computer programmed to perform a method may be as described in the detailed description), software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be executed to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. The mechanisms described herein are not limited in scope to any particular programming language. The language may be a compiled or interpreted language.

One or more aspects of at least one embodiment may be implemented by representative instructions stored on a non-transitory, machine-readable medium which represents various logic within the processor, which when read by a machine causes the machine to fabricate logic to perform the techniques described herein. Such representations, which may be generally referred to as "IP cores" may be stored on a tangible, machine readable medium and supplied to various customers or manufacturing facilities to load into the fabrication machines that make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Figures 9, 10:
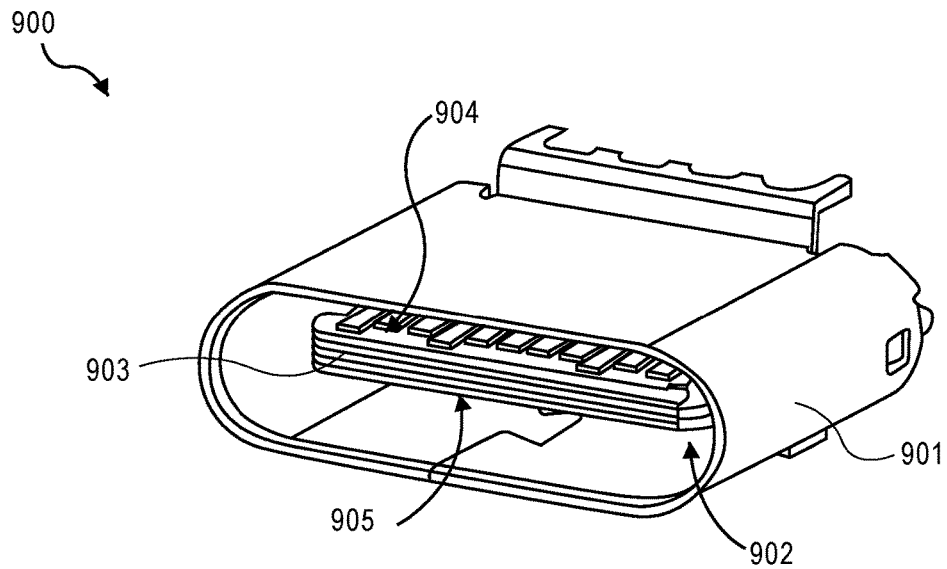
FIG. 9 illustrates a perspective view of a serial bus receptacle.
FIG. 10 illustrates a schematic diagram of the pins of a serial bus.
Figure 11:
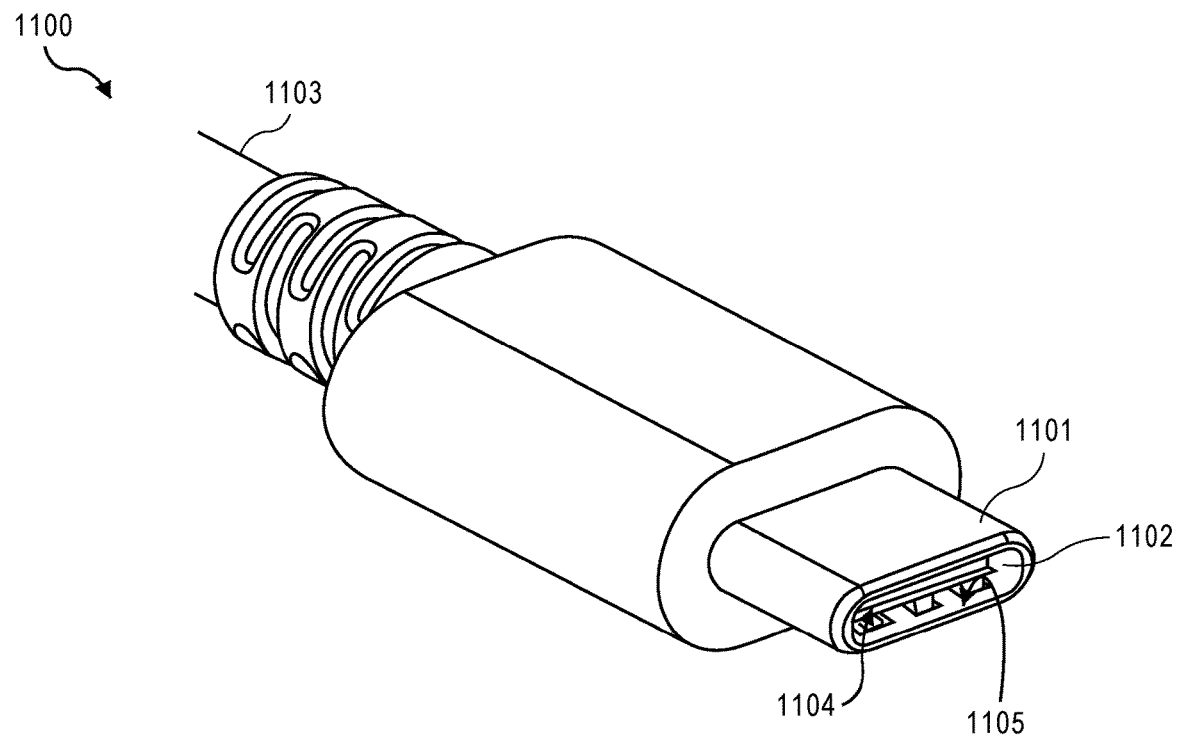
FIG. 11 illustrates a perspective view of a serial bus plug.

FIGS. 9-11 discuss embodiments of receptacles and plugs to connect one device to another device. Table 2 that follows depicts embodiments of channels (e.g., conductors) to allow signals to flow between multiple devices.

TABLE 2

Example Communication Channels

| Pin | Signal Name | Description | Mating Sequence | Pin | Signal Name | Description | Mating Sequence |
|---|---|---|---|---|---|---|---|
| A1 | GND | Ground return | First | B12 | GND | Ground return | First |
| A2 | SSTXp1 | Positive half of first (e.g., SuperSpeed) transmitter (TX) differential pair of a first type | Second | B11 | SSRXp1 | Positive half of first (e.g., SuperSpeed) receiver (RX) differential pair of the first type | Second |
| A3 | SSTXn1 | Negative half of first (e.g., SuperSpeed) TX differential pair of the first type | Second | B10 | SSRXn1 | Negative half of first (e.g., SuperSpeed) RX differential pair of the first type | Second |
| A4 | VBUS | Bus Power | First | B9 | VBUS | Bus Power | First |
| A5 | CC1 | Configuration Channel | Second | B8 | SBU2 | Sideband Use (SBU) | Second |
| A6 | Dp1 | Positive half of a second type (e.g., USB 2.0) of differential pair - Position 1 | Second | B7 | Dn2 | Negative half of the second type (e.g., USB 2.0) of differential pair - Position 2 | Second |
| A7 | Dn1 | Negative half of the second type (e.g., USB 2.0) of differential pair - Position 1 | Second | B6 | Dp2 | Positive half of the second type (e.g., USB 2.0) of differential pair - Position 2 | Second |

TABLE 2-continued

Example Communication Channels

| Pin | Signal Name | Description | Mating Sequence | Pin | Signal Name | Description | Mating Sequence |
|---|---|---|---|---|---|---|---|
| A8 | SBU1 | Sideband Use (SBU) | Second | B5 | CC2 | Configuration Channel | Second |
| A9 | VBUS | Bus Power | First | B4 | VBUS | Bus Power | First |
| A10 | SSRXn2 | Negative half of second (e.g., SuperSpeed) RX differential pair of the first type | Second | B3 | SSTXn2 | Negative half of second (e.g., SuperSpeed) TX differential pair of the first type | Second |
| A11 | SSRXp2 | Positive half of second (e.g., SuperSpeed) RX differential pair of the first type | Second | B2 | SSTXp2 | Positive half of second (e.g., SuperSpeed) TX differential pair of the first type | Second |
| A12 | GND | Ground return | First | B1 | GND | Ground return | First |

FIG. 9 illustrates a perspective view of a serial bus receptacle 900 according to embodiments of the disclosure. In certain embodiments, serial bus receptacle 900 may be part of (e.g., within) a device (e.g., mounted to a circuit board of a device).

FIG. 10 illustrates a schematic diagram 1000 of the pins of a serial bus receptacle (e.g., serial bus receptacle 900) according to embodiments of the disclosure.

FIG. 11 illustrates a perspective view of a serial bus plug 1100 according to embodiments of the disclosure. In certain embodiments, serial bus plug may connect (e.g., physically and electrically) to a serial bus receptacle (e.g., serial bus receptacle 1100).

Figure 12:
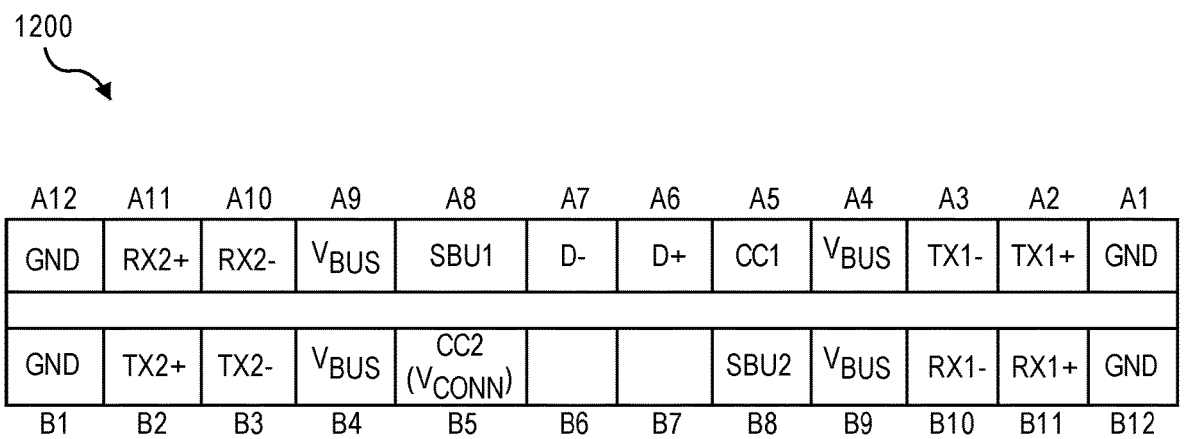
FIG. 12 illustrates a schematic diagram of the pins of a serial bus plug.

FIG. 12 illustrates a schematic diagram 1100 of the pins of a serial bus plug (e.g., serial bus plug 1300) according to embodiments of the disclosure.

In one embodiment, a plug may be received (e.g., inserted) into a receptacle in a plurality of orientations, for example, flipped from one orientation to another orientation, e.g., and retain its (e.g., full) functions. This may be referred to as "flip-ability", e.g., flip-able between a right-side up position and an upside-down position. In certain embodiments, a serial bus plug is flip-able between a right-side up position and an upside-down position (relative to the receptacle it is to be inserted into). In certain embodiments, (e.g., serial bus) plug 1100 of FIG. 11 slides within (e.g., serial bus) receptacle 900 of FIG. 9, e.g., the housing 1101 slides within the shell 901 (e.g., enclosure). Tongue 902 may be (e.g., fixedly) disposed within the bore of the shell 901 of the serial bus receptacle. Depicted tongue 902 includes a first (e.g., substantially planar) side 904 and an opposing second (e.g., substantially planar) side 905. In one embodiment, first side 904 is (e.g., substantially) parallel to the second side 905. One or both of first side 904 and second side 905 may include electrical contacts (e.g., pins, pads, springs, etc.) thereon, e.g., facing in opposing directions. A longitudinal axis of each electrical contact may extend from the rear of shell 901 towards the opening at the front of shell 901, for example, along the first side 904 and/or the second side 905. A leading edge 903 of the tongue 902 may be (e.g., substantially) perpendicular to the first side 904 and the second side 905. The body of the tongue 902, e.g., excluding any electrical contacts thereon, may be a non-conductive material, for example, glass-filled nylon. The leading edge 903 of the tongue 902 may not include any electrical contacts to mate with the electrical (for example, signal and/or data, e.g., but not ground) contacts of a plug. The back wall of the receptacle may not include any electrical contacts to mate with the electrical (for example, signal and/or data, e.g., but not ground) contacts of a plug. First side 904 may include (e.g., only) a first row of electrical contacts thereon, for example, the electrical contacts (e.g., pins) in FIG. 10, e.g., pins A1-A12. Second side 905 may include (e.g., only) a second row of electrical contacts thereon, for example, the electrical contacts (e.g., pins) in FIG. 10, e.g., pins B12-B1. Electrical contacts may physically connect (e.g., fixedly connect) to the circuitry of a device, e.g., a multiple role togging circuit or other circuitry discussed herein.

Turning again to FIG. 11, in certain embodiments, the serial bus plug 1100 includes a housing 1101 with a bore therein, e.g., having an opening at the front of the housing 1101 and a back wall opposite of the opening. Housing 1101 may include electrical contacts in the bore thereof. A first side 1104 of the interior of the housing may be (e.g., substantially) parallel to a second side 1105 of the interior of the housing of the serial bus plug 1100. One or both of first side 1104 and second side 1105 may include electrical contacts (e.g., pins, pads, springs, etc.) thereon, e.g., facing each other. Contacts on the first side 1104 and/or the second side 1105 may couple (e.g., physically and electrically connect) to the first side 904 and/or the second side 905 of receptacle 900. In one embodiment, a first side 1104 of plug 1100 couples with either of the first side 904 and the second side 905 of the receptacle 900 and the second side 1105 of the plug 1100 couples with the other of the first side 904 and the second side 905 of the receptacle 900 (e.g., flip-able). A longitudinal axis of each electrical contact may extend from the rear of housing 1101 towards the opening 1102 at the front of housing 1101, for example, along the first side 1104 and/or the second side 1105. Housing 1101 may be slideably received within an (e.g., continuous) annulus formed between the exterior surface of the tongue 902 and an interior surface of the shell 901 of the receptacle 900. The leading edge of the housing 1101 not include any electrical contacts to mate with the electrical (for example, signal and/or data, e.g., but not ground) contacts of a receptacle. The back wall of the housing 1101 may not include any electrical contacts to mate with the electrical (for example, signal and/or data, e.g., but not ground) contacts of a receptacle. First side 1104 may include (e.g., only) a first row of electrical contacts thereon, for example, the electrical contacts (e.g., pins) in FIG. 12, e.g., pins A12-A1. Second side 1105 may include (e.g., only) a second row of electrical contacts thereon, for example, the electrical contacts (e.g., pins) in FIG. 14, e.g., pins B1-B12. Electrical contacts may physically connect (e.g., fixedly connect) to a cable 1103 or other electrical conductors (for example, wires to a memory device, e.g., a USB memory stick). Cable 1103 may connect to another plug, e.g., to connect to a receptacle that physically connects to the circuitry of a device, e.g., a multiple role togging circuit or other circuitry discussed herein.

Circuitry here may include a transmitter and/or a receiver to send and receive data, respectively, e.g., as part of a transceiver (e.g., a physical layer (PHY) circuit).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for managing mapping of universal serial bus (USB) connectors to a plurality of USB host controllers, the method comprising:
    determining an enumeration of USB connectors in a system;
    identifying USB host controllers in the system;
    generating a grouping for a USB connector with USB host controllers; and
    configuring USB routing in the system to map the USB connector with the USB host controllers according to the grouping.

2. The method of claim 1, wherein generating the grouping comprises:
    identifying a connector number, USB 2 host controller, USB 3 host controller; and
    updating a physical device locator for the USB connector to include the grouping.

3. The method of claim 1, further comprising:
    detecting a connection at the USB connector; and
    updating the grouping for the USB connector during system runtime.

4. The method of claim 2, wherein the physical device locator is created under scope of an operating system policy manager to enable self-hot removal for associated USB host controllers.

5. The method of claim 1, further comprising:
    detecting a connection event; and
    comparing a physical device locator of the USB connector with a physical device locator of a USB port associated with the connection event to determine current USB connector and USB host controller mapping.

6. The method of claim 1, further comprising:
    determining a target USB port for mapping based on platform defined policy.

7. The method of claim 1, wherein connector enumeration is performed at system start by an embedded controller or basic input/output system.

8. A system supporting dynamic mapping of universal serial bus (USB) connectors and USB controllers, the system comprising:
    a set of USB ports managed by a plurality of USB controllers;
    a set of USB connectors;
    a USB routing infrastructure to communicatively couple the set of USB ports with the set of USB connectors; and
    a device mapper to manage mapping of the set of USB connectors with the set of USB ports and USB controllers, the device mapper to provide an initial mapping of the set of USB connectors with the set of USB ports at system start and to dynamically update the mapping during runtime.

9. The system of claim 8, wherein the USB routing infrastructure includes a group multiplexor and a set of upstream facing port (UFP) and downstream facing port (DFP) multiplexors.

10. The system of claim 8, wherein the device mapper enumerates the set of USB connectors during boot up of the system.

11. The system of claim 8, wherein the device mapper generates a physical device locator for each USB connector including a USB connector number and a plurality of USB host controllers from the set of USB controllers.

12. The system of claim 11, wherein at least one USB controller from the set of USB controllers is configured to self-hot remove without affecting the physical device locator that is under control of an operating system policy manager.

13. The system of claim 8, wherein the device mapper modifies a physical device locator for a USB connector in response to detecting a connection or connection event at the USB connector.

14. The system of claim 8, further comprising:
    an embedded controller communicatively coupled to the USB infrastructure, the embedded controller to interface with a processor, the embedded controller to execute the device mapper.

15. The system of claim 8, further comprising:
    a processor coupled to the USB infrastructure, the processor to execute an operating system policy manager, the operating system policy manager including the device mapper.

16. A non-transitory computer-readable medium having stored therein a set of instructions, which when executed by a controller or processor, cause the controller or processor to perform a set of operations, the set of operations to manage communication between universal serial bus (USB) connectors and a plurality of USB controllers, the set of operations comprising:
    receiving notification of a connection at a USB connector; and
    updating a physical device locator for the USB connector by modifying a grouping for the USB connector to indicate a connector number, a first USB host controller and a second USB host controller.

17. The non-transitory computer-readable medium of claim 16, having further instructions stored therein, which when executed cause the controller or processor to perform further operations comprising:
    determining an enumeration of the USB connectors; and
    identifying USB host controllers.

18. The non-transitory computer-readable medium of claim 16, having further instructions stored therein which when executed cause the controller or processor to perform further operations comprising:
    generating the grouping for the USB connector with the first USB host controller and second USB host controller; and
    configuring USB routing in USB infrastructure to map the USB connector with the first USB host controller and second USB host controller according to the grouping.

19. The non-transitory computer-readable medium of claim 16, having further instructions stored therein which when executed cause the controller or processor to perform further operations comprising:
    creating the physical device locator under control of an operating system policy manager to enable self-hot removal for the first USB host controller and second USB host controller.

20. The non-transitory computer-readable medium of claim 16, having further instructions stored therein which when executed cause the controller or processor to perform further operations comprising:
 executing a platform defined policy to determine USB ports to utilize for USB connector mapping.

\* \* \* \* \*